United States Patent
Grandhi et al.

(10) Patent No.: US 12,346,209 B2
(45) Date of Patent: Jul. 1, 2025

(54) SYSTEMS AND METHODS FOR DATA MOVER SELECTION

(71) Applicant: EMC IP Holding Company LLC, Hopkinton, MA (US)

(72) Inventors: Sukarna Grandhi, Fremont, CA (US); Seema Parveen, Santa Clara, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 135 days.

(21) Appl. No.: 17/492,335

(22) Filed: Oct. 1, 2021

(65) Prior Publication Data

US 2023/0106327 A1 Apr. 6, 2023

(51) Int. Cl.
*G06F 11/14* (2006.01)

(52) U.S. Cl.
CPC .... *G06F 11/1451* (2013.01); *G06F 2201/815* (2013.01)

(58) Field of Classification Search
CPC .............. G06F 11/1451; G06F 2201/815
See application file for complete search history.

(56) References Cited

U.S. PATENT DOCUMENTS

| | | | | |
|---|---|---|---|---|
| 2005/0120354 A1* | 6/2005 | Sunada | ............... | G06F 11/3433 |
| | | | | 719/310 |
| 2020/0104050 A1* | 4/2020 | Srinivasan | ............. | G06F 3/067 |
| 2021/0373965 A1* | 12/2021 | Hadas | ................. | G06F 9/45558 |
| 2022/0066670 A1* | 3/2022 | Naik | ..................... | G06F 3/0641 |
| 2022/0179711 A1* | 6/2022 | Yan | ..................... | G06F 16/2474 |

* cited by examiner

*Primary Examiner* — Tony Wu
(74) *Attorney, Agent, or Firm* — Chamberlain, Hrdlicka, White, Williams & Aughtry; Aly Z. Dossa (57) ABSTRACT

Techniques described herein relate to a method for performing data backup operations. The method may include receiving a request to perform a backup operation to back up data associated with a cluster in a virtualization environment; executing, in response to the request, a data mover selection algorithm to select a data mover to perform the backup operation; transmitting an instruction to the selected data mover to perform the backup operation; and performing the backup operation using the selected data mover to back up the data.

6 Claims, 4 Drawing Sheets

SYSTEMS AND METHODS FOR DATA MOVER SELECTION

BACKGROUND

Computing devices often exist in ecosystems that include any number of devices. Devices in such a device ecosystem may perform a variety of workloads. Often, such devices generate, use, store, obtain, etc. data. It is often desirable to protect such data by creating backup copies of the data.

SUMMARY

In general, embodiments described herein relate to a method for performing data backup operations. The method may include receiving a request to perform a backup operation to back up data associated with a cluster in a virtualization environment; executing, in response to the request, a data mover selection algorithm to select a data mover to perform the backup operation; transmitting an instruction to the selected data mover to perform the backup operation; and performing the backup operation using the selected data mover to back up the data.

In general, embodiments described herein relate to a non-transitory computer readable medium that includes computer readable program code, which, when executed by a computer processor enables, the computer processor to perform a method for performing data backup operations. The method may include receiving a request to perform a backup operation to back up data associated with a cluster in a virtualization environment; executing, in response to the request, a data mover selection algorithm to select a data mover to perform the backup operation; transmitting an instruction to the selected data mover to perform the backup operation; and performing the backup operation using the selected data mover to back up the data.

In general, embodiments described herein relate to a system for performing data backup operations. The system may include a processor comprising circuitry; memory; and a data protection controller operatively connected to a data protection manager and a data domain. The data protection controller may be executing within a cluster of a virtualization environment. The data protection controller may be executing on the processor and using the memory. The data protection controller may be configured to receive a request to perform a backup operation to back up data associated with the cluster; execute, in response to the request, a data mover selection algorithm to select a data mover to perform the backup operation; transmit an instruction to the selected data mover to perform the backup operation; and perform the backup operation using the selected data mover to back up the data.

Other aspects of the embodiments disclosed herein will be apparent from the following description and the appended claims.

BRIEF DESCRIPTION OF DRAWINGS

Certain embodiments discussed herein will be described with reference to the accompanying drawings. However, the accompanying drawings illustrate only certain aspects or implementations of embodiments described herein by way of example and are not meant to limit the scope of the claims.

DETAILED DESCRIPTION

Specific embodiments will now be described with reference to the accompanying figures.

In the below description, numerous details are set forth as examples of embodiments described herein. It will be understood by those skilled in the art (who also have the benefit of this Detailed Description) that one or more embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for selecting a data mover to copy data to a data domain in order to create backup copies of the data in accordance with one or more embodiments described herein.

Execution of certain workloads may be performed by clusters (e.g., Kubernetes clusters) of virtual computing instances (e.g., containers, virtual machines (VMs), emulators, etc.). Such clusters may store any amount of data. A cluster may also include a data protection controller configured to receive requests to backup the data of a cluster. In one or more embodiments, the data protection controller is configured to select a data mover to perform the requested backup, and to communicate the request to the selected data mover.

In one or more embodiments, one such data mover is a containerized proxy (cProxy). A cProxy may be deployed within the cluster. In one or more embodiments, a cProxy may be deployed within the cluster to receive the request to backup the data associated with the cluster. In order to perform the backup, the cProxy may need to connect to a virtualization environment manager (e.g., VMware vCenter), read data in persistent volumes, and then write the data to storage in the data domain to create the backup copy of the data.

However, in certain scenarios, such a cProxy may be unable to perform the backup. As an example, the cProxy may not have an appropriate connection to the virtualization environment manager, may not have an appropriate connection to a virtualized host that has the persistent volume(s) to be backed up, may not have sufficient compute resources available to perform the backup, etc. In other scenarios, the cProxy may not be capable of performing the backup with enough expediency to satisfy requirements (e.g., service level objectives (SLOs)) of a user of the cluster. As an example, when large amounts of data must be backed up (e.g., all of a large amount of data, large amounts of data due to high frequency of incremental changes between backups, etc.), it may be advantageous to use a relatively faster backup data transport mode (e.g., hotadd) instead of a relatively slower backup data transport mode (e.g., network block device (NBD)). However, in such a scenario, a cProxy within a cluster may not be capable of using the relatively faster data transport scheme. For example, hotadd requires a virtualized computing device instance (e.g., a VM) that is executing on the same virtualized host where the persistent volume(s) to be backed up exist, and the nodes of a cluster are often not executing on such a host.

In order to mitigate, at least in part, the above-described limitations of the cProxy, one or more embodiments of the invention include a virtualization machine proxy (vProxy). A vProxy may be a VM in which an operating system executes and manages software configured to perform backup and/or restore operations, which may include causing data related to VMs to be copied to a data domain (e.g., a VM backup) or to be restored from a data domain (e.g., a VM restore). As an example, a vProxy may be packaged as a virtual appliance (e.g., in an .ovf format). In one or more embodiments, a vProxy may be able to perform a backup when a cProxy is unable to do so, and/or be a better option to perform a backup (e.g., when a transport technology such as hotadd is required to meet an SLO).

In one or more embodiments, the data protection controller within the cluster receives a request to perform a backup from a data protection manager. In one or more embodiments, the data protection controller, in response to the request, executes an algorithm to select a data mover (i.e., cProxy or vProxy) to perform the backup. Such an algorithm may be referred to as a data mover selection algorithm Such an algorithm may include, but is not limited to: determining if a user has made a specific selection of a preferred data mover (i.e., a data mover selection preference); determining whether a cProxy has an appropriate connection (e.g., port 443) available to connect to a virtualization environment manager (e.g., vCenter); determining whether a cProxy has an appropriate connection (e.g., port 902) to a virtualized host (e.g., an ESX host); determining whether data to be moved is above a data quantity threshold; determining whether a faster data transport technology is required; determining whether the cluster has sufficient resources to instantiate a cProxy to perform the backup, etc.

In one or more embodiments, based on the execution of the aforementioned algorithm, a data protection controller may select to use the cProxy or the vProxy as a data mover to perform the requested backup operation to protect the data of the cluster. As such, embodiments described herein provide for the intelligent selection of a data mover to ensure that data may be protected and/or that the backup is performed by a data mover that is actually capable of performing the backup within any constraints or requirements associated with the requested backup of the data.

Figure 1:
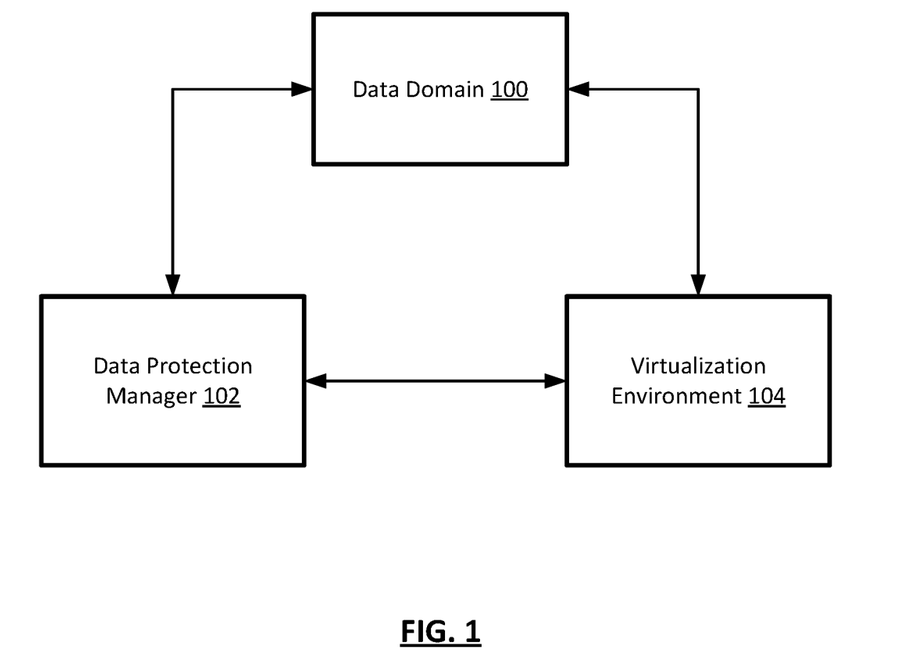
FIG. 1 shows a diagram of a system in accordance with one or more embodiments described herein.

FIG. 1 shows a diagram of a system in accordance with one or more embodiments described herein. The system may include a data domain (100), a data protection manager (102), and a virtualization environment (104). Each of these components is described below.

In one or more embodiments, the data protection manager (102) is a computing device. In one or more embodiments, as used herein, a computing device may refer to a single computing device, a collection of computing devices, a portion of one or more computing devices, or any other logical grouping of computing resources. In one or more embodiments, a data protection manager (102) is part of a device ecosystem, which may include any number of nodes, devices, components, etc. In one or more embodiments, a device ecosystem is a collection of devices, components, etc. arranged and/or operatively connected in any manner, and in which any number of workloads may be executed.

In one or more embodiments, as discussed above, a data protection manager (102) may be a computing device, a portion of a computing device, a set of computing devices, etc. In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), one or more data processing units (DPUs), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device or node. Other types of computing devices may be used without departing from the scope of embodiments described herein.

In one or more embodiments, the non-volatile storage (not shown) and/or memory (not shown) of a computing device or system of computing devices may be and/or include one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code which, when executed, performs methods in accordance with embodiments described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, the data protection manager (102) includes functionality to orchestrate data protection by managing the backup of data from a data source (e.g., a virtualization environment (104), discussed below) to a data domain (100) (discussed below). As an example, a data protection manager (102) may be configured with any number of data protection policies for backing up source data pursuant to a configured schedule. As another example, a data protection manager (102) may be configured to accept requests from users to orchestrate a data backup.

In one or more embodiments, the device ecosystem includes a virtualization environment (104) operatively connected to the data protection manager (102). In one or more embodiments, a virtualization environment is any environment in which any number of computing devices are subject, at least in part, to a shared scheme pooling compute resources for use in deploying virtualized computing device instances (e.g., VMs, containers, emulators, etc.), which may be used in any arrangement (e.g., a cluster) to perform all or any portion of any work requested. In one or more embodiments, a virtualization environment (104) includes any amount of data, which may be backed up, as orchestrated by a data protection manager (102). Virtualization environments are discussed further in the description of FIG. 2, below.

In one or more embodiments, the data protection manager (102) and virtualization environment (104) are operatively connected to a data domain (100). In one or more embodiments, a data domain (100) is a computing device (discussed above) or set of computing devices that include(s) data storage, and includes functionality to store backup copies of data of a virtualization environment.

In one or more embodiments, the data protection manager (102), the virtualization environment (104), and the data domain (100) are operatively connected via a network (not shown). A network may refer to an entire network or any portion thereof (e.g., a logical portion of the devices within a topology of devices). A network may include a datacenter network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap, at least in part, with the Internet.

While FIG. 1 shows a configuration of components, other configurations may be used without departing from the scope of embodiments described herein. As an example, the data protection manager, although shown in FIG. 1 as separate from the virtualization environment and the data domain, may, in certain embodiments, be included in either. Accordingly, embodiments disclosed herein should not be limited to the configuration of components shown in FIG. 1.

Figure 2:
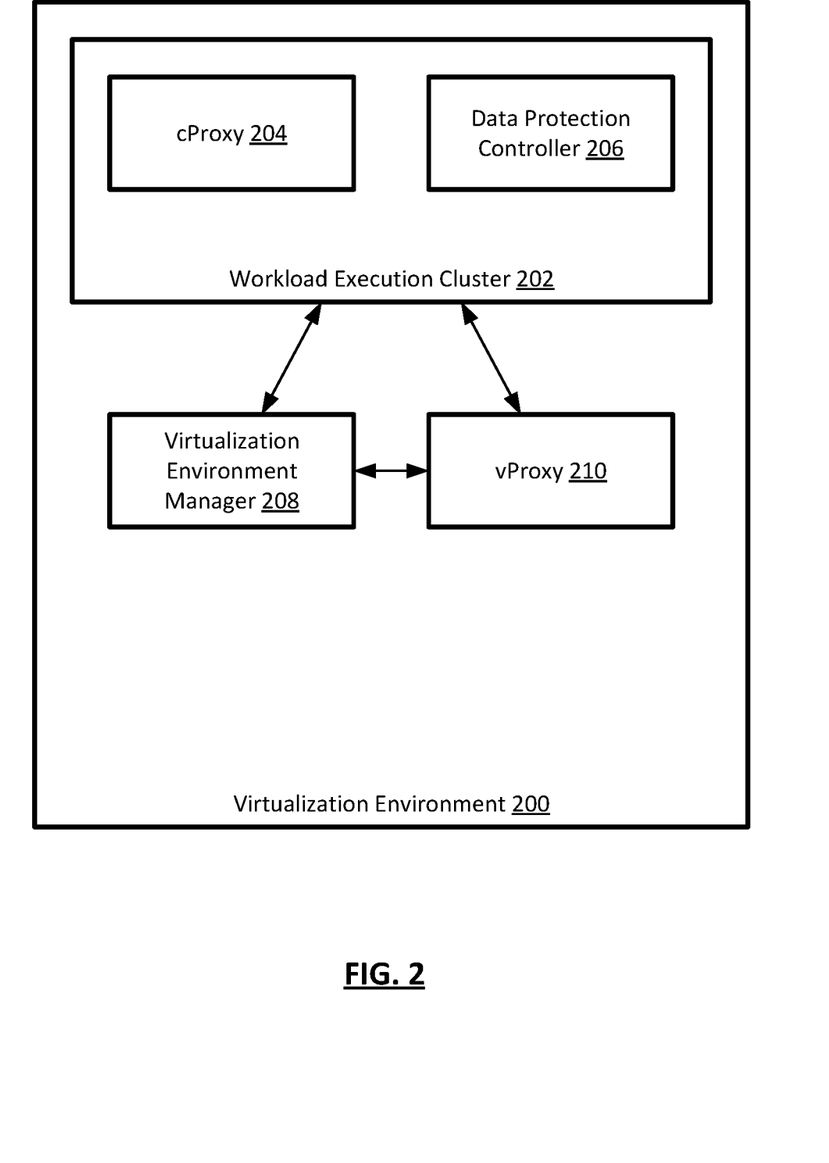
FIG. 2 shows a diagram of a virtualization environment in accordance with one or more embodiments described herein.

FIG. 2 shows a diagram of a virtualization environment (200) in accordance with one or more embodiments described herein. The virtualization environment (200) may include any number of components. As shown in FIG. 2, the virtualization environment (200) includes a virtualization environment manager (208), a vProxy (210), and a workload execution cluster (202). The workload execution cluster (202) may include a cProxy (204) and a data protection controller (206). Each of these components is described below.

In one or more embodiments, the virtualization environment (200) is similar to the virtualization environment (104) shown in FIG. 1 and described above. As such, the virtualization environment (200) may include any number of computing devices. In one or more embodiments, at least a portion of the computing devices of the virtualization environment (200) are virtualization hosts (not shown). In one or more embodiments, the virtualization hosts within the virtualization environment (200) may be any single computing device (described above), collection of computing devices, portion of one or more computing devices, or any other logical grouping of computing resources (e.g., a hyperconverged infrastructure) that are capable of hosting virtualized computing device instances (e.g., VMs, containers, etc.).

In one or more embodiments, a virtualization host includes a hypervisor (not shown), which may also be referred to as a virtual machine monitor. In one or more embodiments, a hypervisor is any hardware (e.g., circuitry), software, firmware, or any combination thereof that includes functionality to manage the underlying hardware resources of a virtualization host, and to make the hardware resources available for use by virtualized computing device instances (e.g., VMs), which execute on the hypervisor. Thus, the hypervisor abstracts the underlying hardware from the VMs.

In one or more embodiments, the hypervisor receives instructions for and/or from VMs and performs the instructions using the appropriate underlying hardware (e.g., processor(s), storage, networking components, etc.). Such instructions from a VM may be altered by the hypervisor into a form appropriate for the underlying hardware. For example, the operating system of a VM may seek to execute instructions for a particular processor type, and the hypervisor may translate the instructions to a form that the actual underlying hardware processors can process. Additionally or alternatively, certain instructions from a VM may be passed through a hypervisor for execution using the underlying hardware without modification. A hypervisor may function as a hardware scheduler that schedules when instructions from various VMs will be executed on underlying hardware, and what portion of the hardware resources of a computing device (e.g., storage, networking, processors, etc.) are made available to a given VM. For example, many VMs, each with virtual processors allocated, may require that the hypervisor schedule when the underlying hardware processors will be used to execute instructions for the VMs. Hypervisors may perform any other functions (e.g., provide virtual network components, virtual storage components, etc.) without departing from the scope of embodiments described herein.

In one or more embodiments, VMs execute on virtualization hosts. In one or more embodiments, a VM is an emulation of a computing device (described above), or any portion thereof, that is abstracted from the underlying hardware of a virtualization host that hosts the VM. In one or more embodiments, a VM may include functionality to perform any of the functionality of a physical computing device, using, via the hypervisor of the virtualization host, the underlying physical hardware of the virtualization host. For example, a VM may include an operating system in which any number of software applications exist and execute. As used herein, a VM may refer to any software execution environment that shares computing resources with other software execution environments, and includes, but is not limited to, virtual machines, emulators, containers, serverless computing environments, sandboxes, etc. A VM may have, obtain, generate, include, etc. any amount of data. Such data may be data shared by any number of VMs.

In one or more embodiments, a virtualization environment (200) also includes a virtualization environment manager (208). In one or more embodiments, a virtualization environment manager (208) is also a computing device (described above). In one or more embodiments, a virtualization environment manager (208) provides a user interface for one or more entities for managing a virtualization environment (200). The virtualization environment manager (208) may be operatively connected to the virtualization hosts of the virtualization environment (200), and therefore has access to information related to the virtualization hosts and VMs executing on the virtualization hosts of the virtualization environment (200), as well as any other computing devices (e.g., storage devices, network devices, etc.) that may exist within the virtualization environment (200). In one or more embodiments, a virtualization environment manager (208) allows entities to view information about the computing devices and/or VMs of a virtualization environment, to modify aspects of the configuration of such devices and VMs, to deploy or remove VMs on the virtualization hosts, to configure networking and storage for the VMs, to facilitate data protection backup operations, and/or to perform any other task(s) relevant to managing a virtualization environment (200).

In one or more embodiments, one type of VM that may execute on a virtualization host of the virtualization environment (200) is a vProxy (210). In one or more embodiments, a vProxy (210) may be used to perform at least a portion of the workload of data transmission to and/or from backup storage devices (e.g., data domain (100) of FIG. 1). A vProxy (210) may be a VM in which an operating system executes and manages software configured to perform backup and/or restore operations, which may include causing data associated with VMs to be copied to a data domain, or to be restored from a data domain. In one or more embodiments, a vProxy (210) is packaged as a virtual appliance (e.g., in an .ovf format).

In one or more embodiments, a vProxy (210) may be associated with a cluster (described below) of virtualized computing instances (e.g., containerized VMs) within the virtualization environment (200) in order to perform backup operations to protect the data of the cluster. In one or more embodiments, a vProxy (210) is deployed within a virtualization environment (200) managed by a virtualization environment manager (208) that also manages the cluster, at least in part. In one or more embodiments, a vProxy (210) is deployed on a virtualization host that includes one or more persistent storage volumes storing the data associated with a cluster. In one or more embodiments, a vProxy (210) is configured to have a communication port (e.g., 443) open to communicate with the virtualization environment manager (208). In one or more embodiments, a vProxy (210) is configured to have a communication port open to communicate with the underlying virtualization host (e.g., port 902) to facilitate using certain data transport technologies. As an example, a vProxy (210) may be configured to communicate with a hypervisor of a virtualization host using port 902 in order to facilitate data transfer using NBD as a data transport technology when backing up data of a workload execution cluster (202).

In one or more embodiments, a vProxy (210) is configured to be capable of using any number of data transport technologies. As an example, a vProxy (210) may be configured to use NBD or hotadd data transport technologies. In such an example, hotadd may refer to a data transport mode in which persistent volumes are mounted to a vProxy executing on the same host that has the volumes, such that the volumes may be accessed by the vProxy as local storage, while NBD may refer to a data transport mode where such volumes are accessible over a network. In one or more embodiments, hotadd data transport mode may take longer than NBD data transport mode to initially configure, but once configured, may be capable of transporting data (e.g., for data protection backup operations) faster than can be achieved using NBD.

In one or more embodiments, the virtualization environment (200) also includes a workload execution cluster (202). In one or more embodiments, a workload execution cluster (202) is a collection of virtualized computing instances (e.g., VMs) that are deployed in a virtualization environment to collectively perform any workload (e.g., data analysis). In one or more embodiments, a workload cluster stores any amount of data within the virtualization environment, which may be accessed by all or any portion of the virtualized computing instances in the workload execution cluster (202). As an example, the workload execution cluster (202)

may be a Kubernetes cluster that includes nodes that execute containerized applications, and may generate, obtain, use, store, etc. any amount of data. In such an example, the various nodes may execute in VMs on virtualization hosts of the virtualization environment (200), and the data may be stored in one or more persistent volumes of one or more virtualization hosts. The various nodes of the workload cluster (202) may be distributed across any number of virtualization hosts of the virtualization environment (200). The various nodes of the workload cluster (202) may not be executing on virtualization hosts that have the persistent volumes in which the data of the cluster is stored.

In one or more embodiments, the workload execution cluster (202) is, at least in part, operatively connected to the virtualization environment manager (208). In one or more embodiments, the workload execution cluster (202) is operatively connected to and associated with a vProxy (210) executing inside the virtualization environment but outside the workload execution cluster (202).

In one or more embodiments, the workload execution cluster (202) includes a cProxy (204). In one or more embodiments, a cProxy (204) is a containerized proxy executing, when instantiated, on one of the nodes of the workload execution cluster (202). In one or more embodiments, a cProxy may be configured to perform backup operations for data of the cluster in which the cProxy (204) exists.

In one or more embodiments, the workload execution cluster (202) also includes a data protection controller (206). In one or more embodiments, the data protection controller (206) executes on one of the nodes in the workload execution cluster (202). In one or more embodiments, the data protection controller (206) within the workload execution cluster (202) is operatively connected to a data protection manager (e.g., data protection manager (102) of FIG. 1). In one or more embodiments, a data protection controller includes functionality to select a cProxy or a vProxy as a data mover to perform a backup operation for data of the workload execution cluster (202) when a request for the same is received from a data protection manager. In one or more embodiments, the data protection controller (206) is configured to execute an algorithm for selecting a data mover. An example of such an algorithm is shown in FIG. 3, and discussed further below.

While FIG. 2 shows a configuration of components, other configurations may be used without departing from the scope of embodiments described herein. For example, a single component may be configured to perform all or any portion of the functionality performed by the components shown in FIG. 2. Accordingly, embodiments disclosed herein should not be limited to the configuration of components shown in FIG. 2.

Figure 3:
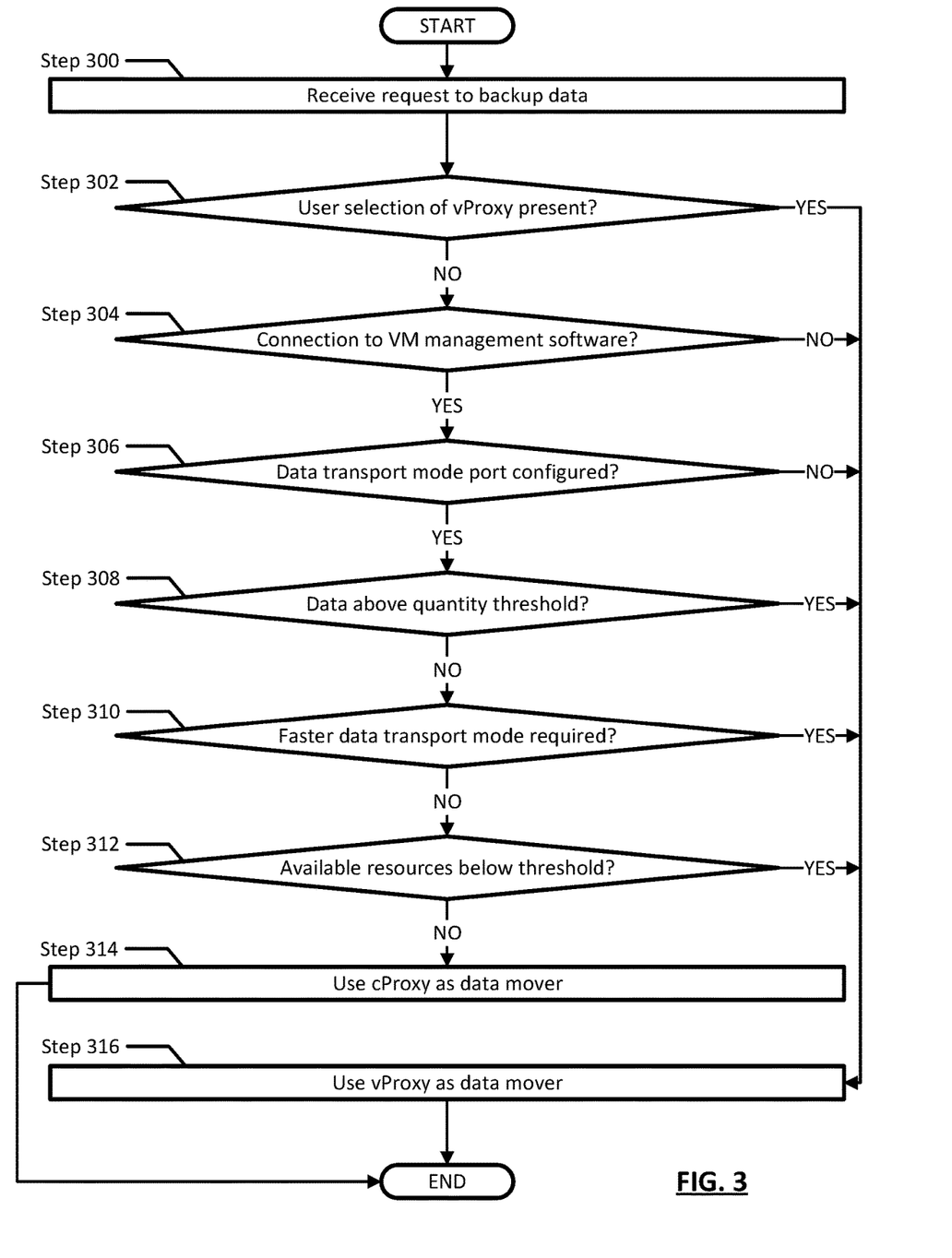
FIG. 3 shows a flowchart of a method for performing data backup operations in accordance with one or more embodiments described herein.

FIG. 3 shows a flowchart describing a method for selecting a data mover to perform a backup operation for data of a cluster in accordance with one or more embodiments disclosed herein.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIG. 3.

In Step 300, a request is received to backup data of a cluster in a virtualization environment. In one or more embodiments, the request is received by a data protection controller within the cluster. In one or more embodiments, the request is received from a data protection manager. In one or more embodiments, the request is received pursuant to a backup schedule defined by a data protection policy being implemented by the data protection manager. In one or more embodiments, the request is received after a user initiates a backup of the data of the cluster. The request may be received using any relevant scheme by which information may be transmitted from one device to another device. As an example, a data protection manager may transmit a backup request to a data protection controller in a cluster by sending one or more network data units to the data protection controller over a network.

In Step 302, in response to the request received in Step 300, a determination is made as to whether a user selection of a data mover exists. In one or more embodiments, a user may configure a data protection controller with a data mover preference, specifying that a certain data mover (i.e., a vProxy or a cProxy) be used to backup data of a cluster. In one or more embodiments, there may be any number of data mover preferences configured on the data protection controller, each associated with a portion (e.g., name space) of the data of the cluster. In such a scenario, the data protection controller may examine the request to determine what portion of the data is to be backed up, and then determine whether a user data mover preference is configured for that portion of the data. In one or more embodiments, if the data protection controller determines that a user selection of a vProxy exists for the data that is requested to be backed up, the method proceeds to Step 316. In one or more embodiments, if the data protection controller determines that there is no user preference selection of a vProxy configured for the data to be backed up, then the method proceeds to Step 304.

In Step 304, a determination is made as to whether the virtualized computing device instances of the cluster are configured such that they have a communication port configured for communication with the virtualization environment manager. For example, the data protection controller may determine whether the nodes of the cluster on which a cProxy may exist are configured to have port 443 open for communication with a relevant application programming interface (API) of the virtualization manager. In one or more embodiments, if such a communication channel to the virtualization device manager is not configured for the nodes of the cluster, then the method proceeds to Step 316. In one or more embodiments, if such a communication channel to the virtualization device manager is configured for the nodes of the cluster, the method proceeds to Step 306.

In Step 306, a determination is made as to whether a data transport mode to be used for backing up data of the cluster is configured on the virtualized computing instances of the cluster on which a cProxy may execute. As an example, a data protection manager may determine whether the containerized VMs of the cluster on which a cProxy may be instantiated are configured to communicate with the underlying hypervisor (e.g., VMware ESX) using port 902, which is required for the cProxy to be capable of performing backup operations using an NBD data transport mode. In one or more embodiments, if the virtualized computing instances of the cluster are not so configured, the method proceeds to Step 316. In one or more embodiments, if the virtualized computing instances of the cluster are configured to use appropriate communication channels to facilitate a relevant data transport mode, the method proceeds to Step 308.

In Step 308, a determination is made as to whether the quantity of data to be backed up is above a data quantity threshold. The data quantity threshold may be any quantity of data. The quantity of data to be backed up may be above the data quantity threshold for any reason. As an example, the request may require performing a full backup of the data of the cluster, and the amount of said data may be higher than the data quantity threshold. As another example, the backup request may be to perform a backup wherein only additions and/or changes to the data since the last backup are to be backed up, but the change rate of the data is high, necessitating a quantity of data to be backed up that is above the data quantity threshold. In one or more embodiments, if the data quantity to be backed up is determined to be above a data quantity threshold, then the method proceeds to Step 316. In one or more embodiments, if the data quantity to be backed up is not above the data quantity threshold, the method proceeds to Step 310.

In Step 310, a determination is made as to whether a relatively faster data transport mode is required to perform the requested data backup operation. In one or more embodiments, the determination may be made based on a combination of the amount of data to be backed up and any requirements related to the backup regarding amount of time within which the backup operation may be performed. As an example, a SLO may define that the data backup must be performed within a certain amount of time. In such a scenario, the data protection controller may be configured to determine if the SLO can be met using a data transport mode that a cProxy is capable of performing (e.g., NBD). In one or more embodiments, a cProxy may not be capable of performing a faster data transport mode. For example, a hotadd data transport mode may require that a data mover VM be executing on a virtualization host that has the persistent volume(s) storing the data of the cluster that is to be backed up, and the virtualized computing instances of the cluster on which a cProxy may be instantiated may not be executing on such a virtualization host. In one or more embodiments, if a determination that a data transport mode that is faster than what a cProxy is configured to use is required, the method proceeds to Step 316. In one or more embodiments, if a determination that a data transport mode that is faster than what a cProxy is configured to use is not required, then the method proceeds to Step 312.

In Step 312, a determination is made as to whether the compute resources of the cluster are below a resource threshold. In one or more embodiments, a resource threshold is a threshold amount of computing resources available for instantiating and executing a cProxy to backup the data that for which a backup operation was requested in Step 300. A resource threshold may relate to processor resources, network resources, storage resources, any other compute resources, and/or any combination thereof. In one or more embodiments, if the compute resources available in the cluster are below the resource threshold, then the method proceeds to Step 316. In one or more embodiments, if the compute resources available in the cluster are not below the resource threshold, the method proceeds to Step 314.

In Step 314, a cProxy is selected as a data mover to perform the backup operation requested in Step 300, and a cProxy is instantiated (if not already instantiated) and requested to perform the backup by accessing the data to be backed up, and copying the data to a data domain.

In Step 316, a vProxy is selected as a data mover to perform the backup operation requested in Step 300. In one or more embodiments, the vProxy is selected because a user has configured vProxy as the selection for backing up the data for which a backup operation is requested (see Step 302). In one or more embodiments, the vProxy is selected because the virtualized computing instances of the cluster on which a cProxy may be instantiated are not configured to have an appropriate communication channel open to a virtualization environment manager (see Step 304), meaning that such a cProxy is unable to perform the requested backup operation. In one or more embodiments, the vProxy is selected because the virtualized computing instances of the cluster on which a cProxy may be instantiated are not configured to have an appropriate communication channel open to a virtualization host that has the persistent volumes on which the data is stored (see Step 306), meaning that such a cProxy is unable to perform the requested backup operation. In one or more embodiments, the vProxy is selected because the quantity of data to be moved is above a data quantity threshold (see Step 308). In one or more embodiments, the vProxy is selected because the requested backup operation requires a faster data transport mode that a cProxy executing within the cluster is unable to perform (see Step 310). In one or more embodiments, the vProxy is selected because the compute resources available within the cluster to execute a cProxy to perform the backup are below a resource threshold (see Step 312).

In one or more embodiments, after either Step 314 or 316, the method ends with the selection of the appropriate data mover, which then performs the requested backup operation.

EXAMPLES

The above describes systems and methods for data mover selection for backing up data of a workload execution cluster of a virtualization environment in accordance with one or more embodiments described herein. Such embodiments may be used for backing up data in device ecosystems with many nodes and any amount of data. However, for the sake of brevity and simplicity, consider the following simplified scenarios to illustrate at least a portion of the concepts described herein.

Example 1

Consider a scenario in which a device ecosystem includes a vSphere virtualization environment in which a Kubernetes cluster is configured with nodes to perform data analysis of data stored in a persistent volume. In such a scenario, it may be important to protect the data by backing up the data to a data domain. Therefore, a data protection manager may be configured with a data protection policy for the data that defines that the data will be backed up once per day.

In such a scenario, when the data protection manger determines that a scheduled backup time has arrived, the data protection manager may send a request to a data protection controller executing within the cluster to perform a backup of the data. In one or more embodiments, in response to receiving the request, the data protection controller executes an algorithm for selecting an appropriate data mover to perform the backup operation. During execution of the algorithm, when the data protection controller determines that a user has configured a vProxy as the preferred data mover for backing up the data, then the data protection controller sends the request to backup the data to a vProxy executing in the virtualization environment on a virtualization host where the persistent volumes storing the data exist. In response to the request, the vProxy performs the backup using hotadd data transport mode, which is available because the vProxy is executing on an appropriate host to allow the mounting of the persistent volumes as local storage of the vProxy. If the vProxy was not executing on such a host, then the vProxy may use, as a fallback option, an NBD data transport mode to perform the backup operation.

End of Example 1

Example 2

Consider a scenario in which a device ecosystem includes a vSphere virtualization environment in which a Kubernetes cluster is configured with nodes to perform data analysis of data stored in a persistent analysis. In such a scenario, it may be important to protect the data of the data by backing up the data to a data domain. Therefore, a data protection manager may be configured with a data protection policy for the data that defines that the data will be backed up once per day.

In such a scenario, when the data protection manger determines that a scheduled backup time has arrived, the data protection manager may send a request to a data protection controller executing within the cluster to perform a backup of the data. In one or more embodiments, in response to receiving the request, the data protection controller executes an algorithm for selecting an appropriate data mover to perform the backup operation. During execution of the algorithm, when the data protection controller determines that the nodes of the cluster are not configured to communicate with the vCenter instance managing the vSphere virtualization environment using port 443, then the data protection controller sends the request to backup the data to a vProxy executing in the virtualization environment on a virtualization host where the persistent volumes storing the data exist. In response to the request, the vProxy performs the backup using hotadd data transport mode, which is available because the vProxy is executing on an appropriate host to allow the mounting of the persistent volumes as local storage of the vProxy. If the vProxy was not executing on such a host, then the vProxy may use, as a fallback option, an NBD data transport mode to perform the backup operation.

End of Example 2

Example 3

Consider a scenario in which a device ecosystem includes a vSphere virtualization environment in which a Kubernetes cluster is configured with nodes to perform data analysis of data stored in a persistent volume. In such a scenario, it may be important to protect the data by backing up the data to a data domain. Therefore, a data protection manager may be configured with a data protection policy for the data that defines that the data will be backed up once per day.

In such a scenario, when the data protection manger determines that a scheduled backup time has arrived, the data protection manager may send a request to a data protection controller executing within the cluster to perform a backup of the data. In one or more embodiments, in response to receiving the request, the data protection controller executes an algorithm for selecting an appropriate data mover to perform the backup operation. During execution of the algorithm, when the data protection controller determines that the nodes of the cluster are not configured to communicate with the virtualization host that has the persistent volumes storing the data using port 902 to facilitate NBD data transport mode, then the data protection controller sends the request to backup the data to a vProxy executing in the virtualization environment on a virtualization host where the persistent volumes storing the data exist. In response to the request, the vProxy performs the backup using hotadd data transport mode, which is available because the vProxy is executing on an appropriate host to allow the mounting of the persistent volumes as local storage of the vProxy. If the vProxy was not executing on such a host, then the vProxy may use, as a fallback option, an NBD data transport mode to perform the backup operation.

End of Example 3

Example 4

Consider a scenario in which a device ecosystem includes a vSphere virtualization environment in which a Kubernetes cluster is configured with nodes to perform data analysis of data stored in a persistent volume. In such a scenario, it may be important to protect the data by backing up the data to a data domain. Therefore, a data protection manager may be configured with a data protection policy for the data that defines that the data will be backed up once per day.

In such a scenario, when the data protection manger determines that a scheduled backup time has arrived, the data protection manager may send a request to a data protection controller executing within the cluster to perform a backup of the data. In one or more embodiments, in response to receiving the request, the data protection controller executes an algorithm for selecting an appropriate data mover to perform the backup operation. During execution of the algorithm, when the data protection controller determines that the quantity of data that must be backed up is greater than ten gigabytes (e. g., a configured data quantity threshold), then the data protection controller sends the request to backup the data to a vProxy executing in the virtualization environment on a virtualization host where the persistent volumes storing the data exist. In response to the request, the vProxy performs the backup using hotadd data transport mode, which is available because the vProxy is executing on an appropriate host to allow the mounting of the persistent volumes as local storage of the vProxy. If the vProxy was not executing on such a host, then the vProxy may use, as a fallback option, an NBD data transport mode to perform the backup operation.

End of Example 4

Example 5

Consider a scenario in which a device ecosystem includes a vSphere virtualization environment in which a Kubernetes cluster is configured with nodes to perform data analysis of data stored. In such a scenario, it may be important to protect the data by backing up the data to a data domain. Therefore, a data protection manager may be configured with a data protection policy for the data that defines that the data will be backed up once per day.

In such a scenario, when the data protection manger determines that a scheduled backup time has arrived, the data protection manager may send a request to a data protection controller executing within the cluster to perform a backup of the data. In one or more embodiments, in response to receiving the request, the data protection controller executes an algorithm for selecting an appropriate data mover to perform the backup operation. During execution of the algorithm, when the data protection controller determines that a SLO associated with the cluster requires that the data be backed up within 12 hours and the amount of data is more than can be moved using NBD data transport mode in such a time window, then the data protection controller sends the request to backup the data to a vProxy executing in the virtualization environment on a virtualization host where the persistent volumes storing the data exist. In response to the request, the vProxy performs the backup using hotadd data transport mode, which is available because the vProxy is executing on an appropriate host to allow the mounting of the persistent volumes as local storage of the vProxy. If the vProxy was not executing on such a host, then the vProxy may use, as a fallback option, an NBD data transport mode to perform the backup operation.

End of Example 5

Example 6

Consider a scenario in which a device ecosystem includes a vSphere virtualization environment in which a Kubernetes cluster is configured with nodes to perform data analysis of data. In such a scenario, it may be important to protect the data by backing up the data to a data domain. Therefore, a data protection manager may be configured with a data protection policy for the data that defines that the data will be backed up once per day.

In such a scenario, when the data protection manger determines that a scheduled backup time has arrived, the data protection manager may send a request to a data protection controller executing within the cluster to perform a backup of the data. In one or more embodiments, in response to receiving the request, the data protection controller executes an algorithm for selecting an appropriate data mover to perform the backup operation. During execution of the algorithm, when the data protection controller determines that the amount of compute resources available within the cluster for executing a cProxy to perform the backup of the data is below a resource threshold, then the data protection controller sends the request to backup the data to a vProxy executing in the virtualization environment on a virtualization host where the persistent volumes storing the data exist. In response to the request, the vProxy performs the backup using hotadd data transport mode, which is available because the vProxy is executing on an appropriate host to allow the mounting of the persistent volumes as local storage of the vProxy. If the vProxy was not executing on such a host, then the vProxy may use, as a fallback option, an NBD data transport mode to perform the backup operation.

End of Example 6

Example 7

Consider a scenario in which a device ecosystem includes a vSphere virtualization environment in which a Kubernetes cluster is configured with nodes to perform data analysis of data. In such a scenario, it may be important to protect the data by backing up the data to a data domain. Therefore, a data protection manager may be configured with a data protection policy for the data that defines that the data will be backed up once per day.

In such a scenario, when the data protection manger determines that a scheduled backup time has arrived, the data protection manager may send a request to a data protection controller executing within the cluster to perform a backup of the data. In one or more embodiments, in response to receiving the request, the data protection controller executes an algorithm for selecting an appropriate data mover to perform the backup operation. During execution of the algorithm, when the data protection controller determines that the nodes of the cluster are configured to communicate with vCenter via port 443, that the nodes of the cluster are configured to communicate with a virtualization host where the persistent volumes storing the data exist using port 902, that the amount of data to be backed up is below a data quantity threshold, that hotadd data transport mode is not required, and that enough resources exist in the cluster to execute a cProxy to perform the backup, then the cProxy is selected as the data mover to perform the backup operation to backup the data. Based on the selection, a cProxy is instantiated. The cProxy then access the data and uses an NBD data transport mode to perform the backup of the data. Additionally or alternatively, the data protection controller may select the cProxy as the data mover based on a user configured preference for using a cProxy to backup the data.

End of Example 7

Figure 4:
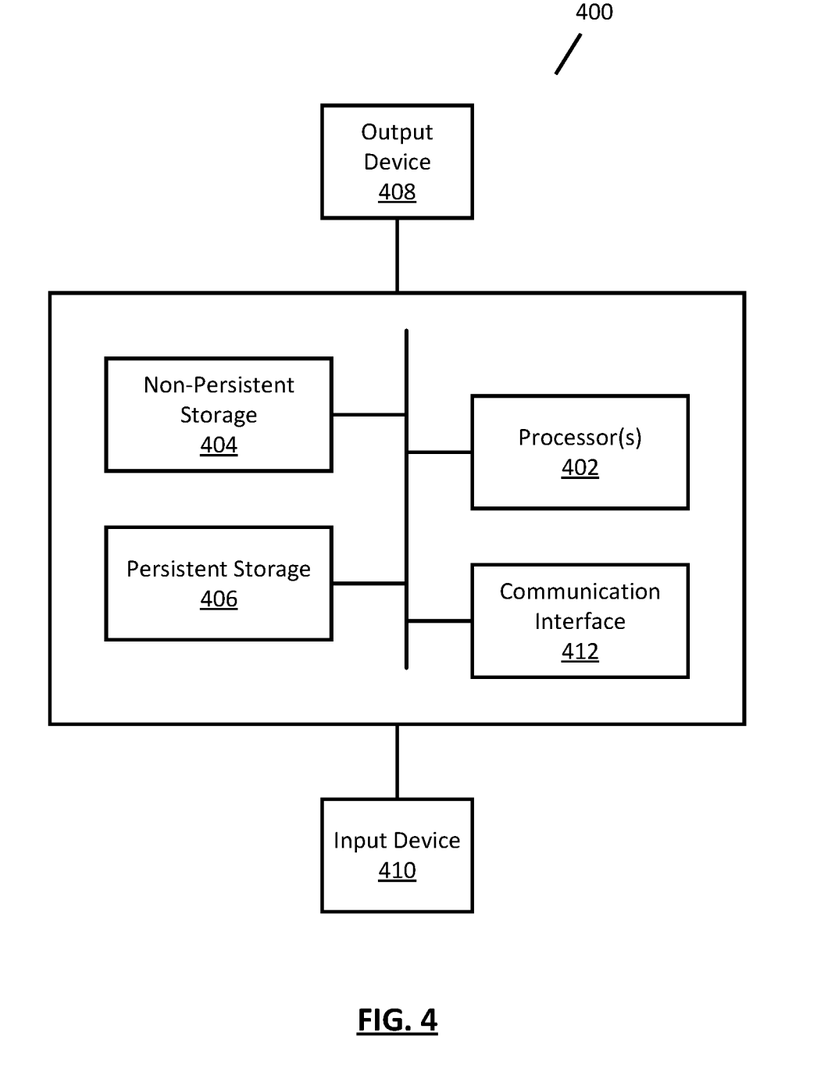
FIG. 4 shows a computing system in accordance with one or more embodiments described herein.

As discussed above, embodiments described herein may be implemented using computing devices. FIG. 4 shows a diagram of a computing device in accordance with one or more embodiments described herein. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one or more embodiments, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one or more embodiments, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed above should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing data backup operations, the method comprising:
receiving a request to perform a backup operation to back up data associated with a cluster deployed in a virtualization environment, the cluster comprising a plurality of virtualized computing device instances and a containerized proxy (cProxy) hosted on at least one virtualized computing device instance in the plurality of virtualized computing device instances, wherein the virtualization environment hosts a virtualization machine proxy (vProxy) as a virtual appliance outside the cluster;
executing, in response to the request, a data mover selection algorithm to select a data mover to perform the backup operation,
wherein the executing of the data mover selection algorithm comprises:
making a first determination that a user selection of the vProxy as the data mover does not exist,
making, based on the first determination, a second determination that the at least one virtualized computing device instance, on which the cProxy is hosted, is configured with a communication channel for communicating with a virtualization environment manager of the virtualization environment, the virtualization environment manager being located outside the cluster,
making, based on the second determination, a third determination that a data transport mode to be used to perform the backup operation is configured,
making, based on the third determination, a fourth determination that a quantity of data to be backed up is below a data quantity threshold,
making, based on the fourth determination, a fifth determination that a faster data transport mode is not required to perform the backup operation, and
making, based on the fifth determination, a sixth determination that computing resources of the cluster are above a resource threshold, wherein the cProxy is the selected data mover based on the sixth determination;
transmitting an instruction to perform the backup operation to the cProxy; and
performing the backup operation using the cProxy to back up the data.

2. The method of claim 1, wherein the request is received by a data protection controller executing in the cluster.

3. The method of claim 1, wherein if at least one of the first determination, the second determination, the third determination, the fourth determination, the fifth determination, or the sixth determination fail, then the instruction to perform the backup operation is sent to the vProxy and not to the cProxy and the backup operation would be performed by the vProxy.

4. A method for performing data backup operations, the method comprising:
receiving a request to perform a backup operation to back up data associated with a cluster deployed in a virtualization environment, the cluster comprising a plurality of virtualized computing device instances and a containerized proxy (cProxy) hosted on at least one virtualized computing device instance in the plurality of virtualized computing device instances, wherein the virtualization environment hosts a virtualization machine proxy (vProxy) as a virtual appliance outside the cluster;
executing, in response to the request, a data mover selection algorithm to select a data mover to perform the backup operation,
wherein the executing of the data mover selection algorithm comprises:
making a first determination as to whether a user selection of the vProxy as the data mover does not exist;
making a second determination as to whether the at least one virtualized computing device instance, on which the cProxy is hosted, is configured with a communication channel for communicating with a virtualization environment manager of the virtualization environment, the virtualization environment manager being located outside the cluster;
making a third determination as to whether a data transport mode to be used to perform the backup operation is configured on the at least one virtualized computing device instance on which the cProxy can execute;
making a fourth determination as to whether a quantity of data to be backed up is below a data quantity threshold;
making a fifth determination as to whether a faster data transport mode is not required; and
making a sixth determination as to whether computing resources of the cluster are above a resource threshold;
transmitting an instruction to perform the backup operation to the vProxy as the selected data mover when any of the first determination, the second determination, the third determination, the fourth determination, the fifth determination, and the sixth determinations fail; and
performing the backup operation using the selected data mover to back up the data.

5. The method of claim 4, wherein the request is received by a data protection controller executing in the cluster.

6. The method of claim 4, wherein if the first determination, the second determination, the third determination, the fourth determination, the fifth determination, and the sixth determination are all passed, then the instruction to perform the backup operation is sent to the cProxy and not the vProxy and the backup operation is performed by the cProxy.

* * * * *